United States Patent
Magnusson et al.

(10) Patent No.: US 10,590,866 B2
(45) Date of Patent: Mar. 17, 2020

(54) METHOD AND AN APPARATUS FOR CONTROLLING AN INTERNAL COMBUSTION ENGINE WITH A HIGH PRESSURE GAS INJECTION

(71) Applicant: VOLVO TRUCK CORPORATION, Göteborg (SE)

(72) Inventors: Ingemar Magnusson, Göteborg (SE); Lennart Andersson, Varberg (SE)

(73) Assignee: VOLVO TRUCK CORPORATION, Göteborg (SE)

(*) Notice: Subject to any disclaimer, the term of this patent is extended or adjusted under 35 U.S.C. 154(b) by 128 days.

(21) Appl. No.: 15/775,295

(22) PCT Filed: Nov. 13, 2015

(86) PCT No.: PCT/EP2015/076563
§ 371 (c)(1),
(2) Date: May 10, 2018

(87) PCT Pub. No.: WO2017/080617
PCT Pub. Date: May 18, 2017

(65) Prior Publication Data
US 2018/0320607 A1  Nov. 8, 2018

(51) Int. Cl.
*F02D 19/06* (2006.01)
*F02M 25/12* (2006.01)
(Continued)

(52) U.S. Cl.
CPC ..... *F02D 19/0647* (2013.01); *F02D 19/0671* (2013.01); *F02D 19/081* (2013.01);
(Continued)

(58) Field of Classification Search
CPC ............. F02D 19/0647; F02D 19/0671; F02D 19/081; F02D 41/0025; F02D 41/0027;
(Continued)

(56) References Cited

U.S. PATENT DOCUMENTS

| 5,097,803 A | 3/1992 | Galvin |
| 5,373,700 A * | 12/1994 | McIntosh ................. F17C 9/02 123/525 |

(Continued)

FOREIGN PATENT DOCUMENTS

| CA | 2868338 A1 | 12/2014 |
| JP | 2004051049 A | 2/2004 |

(Continued)

OTHER PUBLICATIONS

Hayashi, JP 2008-31966, machine translation (Year: 2008).*
International Search Report (Sep. 15, 2016) for corresponding International App. PCT/EP2015/076563.

*Primary Examiner* — Hung Q Nguyen
*Assistant Examiner* — Mark L. Greene
(74) *Attorney, Agent, or Firm* — Venable LLP; Jeffri A. Kaminski (57) ABSTRACT

A method is provided for controlling a high pressure gas injection internal combustion engine including at least one cylinder, the method including supplying a first gaseous fuel from a first gas injection system and injecting the first gaseous fuel in at least one of the at least one cylinder. The method includes converting waste gas from the first gas injection system to a second fuel, and injecting the second fuel obtained by the conversion into at least one of said at least one cylinder.

38 Claims, 4 Drawing Sheets

(51) Int. Cl.
  *F02M 21/02* (2006.01)
  *F02D 19/08* (2006.01)
  *F02M 25/08* (2006.01)
  *F02D 41/00* (2006.01)

(52) U.S. Cl.
  CPC .... *F02M 21/0215* (2013.01); *F02M 21/0227* (2013.01); *F02M 21/0245* (2013.01); *F02M 21/0287* (2013.01); *F02M 25/12* (2013.01); *F02D 41/0025* (2013.01); *F02D 41/0027* (2013.01); *F02M 25/089* (2013.01); *Y02T 10/121* (2013.01); *Y02T 10/36* (2013.01)

(58) Field of Classification Search
  CPC ... Y02T 10/36; Y02T 10/121; F02M 21/0209; F02M 2200/953; F02M 21/0227; F02M 21/0245; F02M 21/0287; F02M 21/0215; F02M 25/089; F02M 25/12; C10G 2/32
  See application file for complete search history.

(56) References Cited

U.S. PATENT DOCUMENTS

| | | | | |
|---|---|---|---|---|
| 5,421,161 | A * | 6/1995 | Gustafson | F17C 9/02 62/7 |
| 6,058,713 | A * | 5/2000 | Bowen | B23K 9/173 62/7 |
| 6,125,637 | A * | 10/2000 | Bingham | F02B 43/00 62/48.2 |
| 6,205,957 | B1 * | 3/2001 | Saylor | F02B 43/10 123/27 GE |
| 6,508,209 | B1 * | 1/2003 | Collier, Jr. | F02B 43/00 123/3 |
| 6,663,350 | B2 * | 12/2003 | Tyree, Jr. | F04B 5/00 417/213 |
| 6,698,211 | B2 * | 3/2004 | Gustafson | F17C 5/06 62/50.2 |
| 7,497,180 | B2 * | 3/2009 | Karlsson | B63J 99/00 114/74 R |
| 9,657,901 | B2 * | 5/2017 | Barker | F17C 7/04 |
| 9,897,055 | B2 * | 2/2018 | Batenburg | F17C 9/02 |
| 9,903,534 | B2 * | 2/2018 | Gustafson | F02M 21/0221 |
| 2005/0126220 | A1 * | 6/2005 | Ward | F17C 9/02 62/625 |
| 2010/0268442 | A1 * | 10/2010 | Kabashima | F02D 41/0025 701/103 |
| 2011/0100323 | A1 | 5/2011 | Bradley et al. | |
| 2013/0160747 | A1 * | 6/2013 | Gibson | F02M 21/06 123/557 |
| 2013/0228151 | A1 * | 9/2013 | Dunn | F02M 21/0209 123/294 |
| 2015/0000630 | A1 | 1/2015 | Coldren | |
| 2015/0083055 | A1 * | 3/2015 | Melanson | F02M 21/02 123/2 |
| 2016/0178128 | A1 * | 6/2016 | Le Bruchec | F02M 21/0215 62/50.5 |
| 2018/0320610 | A1 * | 11/2018 | Magnusson | F02D 19/0692 |
| 2019/0003425 | A1 * | 1/2019 | Pages | F04B 25/00 |

FOREIGN PATENT DOCUMENTS

| | | |
|---|---|---|
| JP | 2008031966 A * | 2/2008 |
| WO | 0031461 A1 | 6/2000 |
| WO | 2004051060 A1 | 6/2004 |

\* cited by examiner

METHOD AND AN APPARATUS FOR CONTROLLING AN INTERNAL COMBUSTION ENGINE WITH A HIGH PRESSURE GAS INJECTION

BACKGROUND AND SUMMARY

The invention relates to a method for controlling a high pressure gas injection internal combustion engine. The invention also relates to a fuel system for a high pressure gas injection internal combustion engine.

The invention can be applied in heavy-duty vehicles such as trucks, buses and construction equipment, e.g. working machines. The invention can also be applied to cars. Although the invention will be described with respect to a truck, the invention is not restricted to this particular vehicle type.

In internal combustion engines with high pressure gas injection (HPGI), there are usually requirements to dispense of high pressure gas, e.g. during a rapid pressure decrease in the injection system due to a decrease in the engine load, or during an engine stoppage. A need to vent boil-off gas from the gaseous fuel storage is another common reason for disposing of gas. Such disposal will of course create an environmental disturbance, since it involves emitting unburned hydrocarbons into the atmosphere.

CA2868338A1 suggests, for an internal combustion engine with direct gas injection, capturing vented gaseous fuel, storing it in an accumulator, and reintroducing it for engine combustion at a later time. During high load operations of engine, the gaseous fuel from the accumulator is introduced upstream, of an air intake compressor and a gas and air premix is thereby added in the cycles in the cylinders before the regular direct gas injection. A problem with this solution is that it gives little possibilities to control the process of burning the captured fuel. Such control is desirable in a vehicle, in which the engine undergo a large number of load changes during a relatively short span of time.

It is desirable to reduce emissions from fuel systems of high pressure gay injection internal combustion engines. It is also desirable to reduce waste gas emissions from high pressure gas injection internal combustion engines. It is also desirable to improve the control over fuel system emission reduction measures in high pressure gas injection internal combustion engines.

According to an aspect of the invention, a method is provided for controlling a high pressure gas injection internal combustion engine comprising at least one cylinder, comprising supplying a first gaseous fuel from a first gas injection system and injecting the first gaseous fuel in at least one of said at least one cylinder, characterized by converting waste gas from the first gas injection system to a second fuel, and injecting the second fuel obtained by the conversion into at least one of said at least one cylinder.

Differing from said CA2868338A1, the invention provides for a large degree of control when using the waste gas in engine operations. In CA2868338A1 the gaseous fuel from the accumulator is provided upstream of the compressor, and will therefore be distributed in a fuel and air premix to all cylinders, which does not give very much room for control over the combustion of the gaseous fuel from the accumulator. Differing from this, since the invention provides for the waste gas from the first gas injection system to be converted to a second fuel, and injected into at least one of said at least one cylinder, the amount and timing of the combustion of the second fuel will be highly controllable, e.g. in view of the operational condition of the engine. The improved control provided by the invention is particularly useful in a vehicle, in which the engine undergoes a large number of load changes during a relatively short span of time, and fast adaptions to new load situations is highly beneficial.

Also, the invention also provides for running a dual fuel HPGI vehicle with a single fuel. More particularly, the invention makes it possible, as exemplified below, to convert the waste gas from the first gaseous fuel, e.g. in the form of liquid natural gas (LNG), to a second fuel in the form of pilot fuel or igniter fuel, e.g. dimethyl ether (DME), for pilot injections in the cycles in the engine cylinders. Thereby, the invention provides the dual benefit of eliminating waste gas emission from a HPGI vehicle and eliminating the need for adapting the vehicle to be fuelled with two fuel types, thereby reducing the complexity and cost of the vehicle.

The step of injecting the second fuel preferably comprises injecting the second fuel obtained by the conversion into the at least one cylinder into which the first gaseous fuel is injected. The step of injecting the first gaseous fuel may comprise injecting the first gaseous fuel in a combustion cycle in the cylinder, and the step of injecting the second fuel may comprise injecting the second fuel obtained by the conversion in a further injection in said combustion cycle. The injection of the first gaseous fuel is a main injection, and the injection of the second fuel is a pilot injection. The pilot inject c it is adapted to ignite the combustion of the main injection. As suggested, thereby, besides providing a high degree of control over the emission reducing waste gas removal process, a vehicle provided with a HPGI engine needs to be equipped for filling of one fuel type only.

The invention advantageously provides for emission reduction of waste gas obtained in different manners. For example, where the first gas injection system comprises a first container, e.g. an LNG tank, the step of converting waste gas from the first gas injection system to the second fuel may comprise converting boil-off gas from the first container to the second fuel. Where the first gas injection system comprises at least one first injector for the injection of the first gaseous fuel, and a first conduit for guiding the first gaseous fuel, e.g. from a first container and a high pressure pump, to the at least one of said at least one cylinder, the step of converting waste gas from the first gas injection system to the second fuel may comprise converting first gaseous fuel received from the first conduit to the second fuel.

Preferably the method comprises storing the waste gas from the first gas injection system in a second container before converting the waste gas to the second fuel. Thereby, the conversion process will be less dependent on variation in the production of waste gas, since said storage may provide a buffer function.

Preferably, the method comprises storing the second fuel obtained by the conversion before injecting the second fuel. Thereby, the control over the use of the second fuel is improved, since it is not dependent on the conversion production rate, but can be adapted to requirements like engine load etc.

Preferably, the second fuel obtained by the conversion is a liquid fuel, for example DME. The conversion to the second fuel may comprise reforming the waste gas to syngas, e.g. in a steam reformer as exemplified below, involving mixing the waste gas with water. Methanol may be produced based on the syngas, and DME may be produced based on the methanol, e.g. in a DME reactor. This provides a beneficial conversion method for the implementation of the invention. Water and methanol remaining after the DME reactor may be separated and fed into the steam reformer.

Preferably, the method comprises using at least one surplus product, such as hydrogen, unreacted carbon monoxide and/or rest methane, from the step of producing methanol for heat generation for the step of reforming the waste gas to syngas. Thereby bi-products obtained in the conversion is used for fuelling the conversion process itself which is cost effective and reduces emissions from the fuel system further. As also exemplified below, the heat generation may be provided e.g. by means of a burner or a catalyst.

Advantageously, where a fuel converter for the conversion of the waste gas to the second fuel is provided, the method comprises guiding excess gas from the fuel converter to the engine. This provides an advantageous way of disposing of excess gases in an environmentally beneficial manner, e.g. where the fuel converter comprises a steam reformer for which heat is generated as exemplified above, and where the heat generation produces the excess gases. The excess gases may be mixed in an air intake system with intake air for the engine or they may be directly injected into one or more of the cylinders, to be converted to carbon dioxide and water in a combustion. In alternative embodiments, the fuel system may be arranged to guide excess gas to an exhaust after treatment system for the engine.

In some embodiments, the conversion to the second fuel comprises mixing the waste gas with air as a reactant for an autotherm reformer for producing dimethyl ether (DME). Thus, such autotherm reformer may be provided as an alternative to said steam reformer, for providing syngas, and a reactor may be provided for a direct conversion from syngas to DME.

In further embodiments, the conversion to the second fuel may comprise a use of a Fisher-Tropsch reactor to produce the second fuel in the form of a hydrocarbon. Thus, such embodiments may provide an alternative to DME production, providing a diesel like hydrocarbon.

According to another aspect of the invention, a fuel system for a high pressure gas injection internal combustion engine is provided comprising at least one cylinder, comprising
a first gas injection system for injecting a first gaseous fuel into at least one of the at least one cylinder,
a second fuel injection system arranged to receive waste gas from the first gas injection system,
characterised in that the second fuel injection system comprises a fuel converter for converting the received waste gas to a second fuel, and in that the second fuel injection system is arranged to inject the second fuel into at least one of the at least one cylinder.

Advantages provided by the fuel system is understood from the description of embodiments of the method above. The first gas injection system may comprise a main injector for each cylinder of the engine, and the second fuel injection system may comprise a pilot injector in each cylinder of the engine.

Preferably, the fuel converter comprises a steam reformer for reforming the waste gas to syngas. A methanol reactor may be provided for producing methanol based on the syngas from the steam reformer, and a DME reactor may be provided for producing the DME based on the methanol. The fuel converter may comprises a heat generating device arranged to receive at least one surplus product from the methanol reactor and to generate heat for the steam reformer by means of the surplus product. Since preparing DME based on methane requires oxygen, the use of a steam reformer involves an advantageous manner of introducing the oxygen with water. It is advantageous since it, as opposed to partial oxidation, i.e. introducing the oxygen with air, does not introduce nitrogen which may reduce the purity of the DME and produce excessive heat.

In alternative embodiments, the fuel converter comprises an autotherm reformer for producing the second fuel in the form of DME. An advantage with the use of an authotherm reformer is that it does not require any external heat for its process.

Further advantages and advantageous futures of the invention are disclosed in the following description and in the dependent claims.

BRIEF DESCRIPTION OF THE DRAWINGS

With reference to the appended drawings, below follows a more detailed description of embodiments of the invention cited as examples. In the drawings.

DETAILED DESCRIPTION

Figure 1:
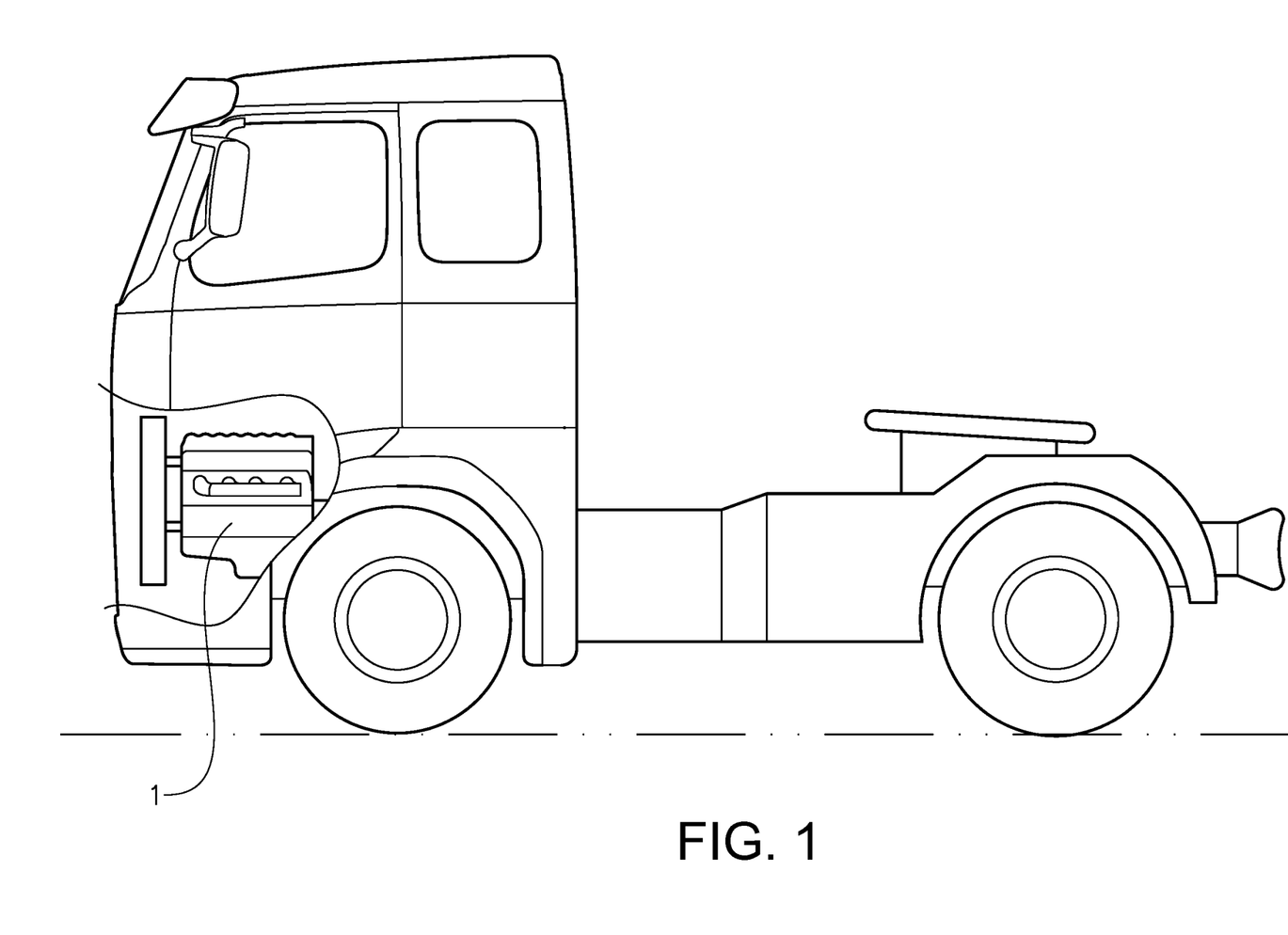
FIG. 1 is a partially sectioned side view of a vehicle in the form of a truck.

FIG. 1 shows a vehicle in the form of a truck, or a tractor for a semitrailer. It should be noted that the vehicle can be of a variety of alternative types, e.g. it may be a car, a bus, or a working machine such as a wheel loader. The vehicle comprises an engine system with a high pressure gas injection (HPGI) internal combustion engine 1.

Figure 2:
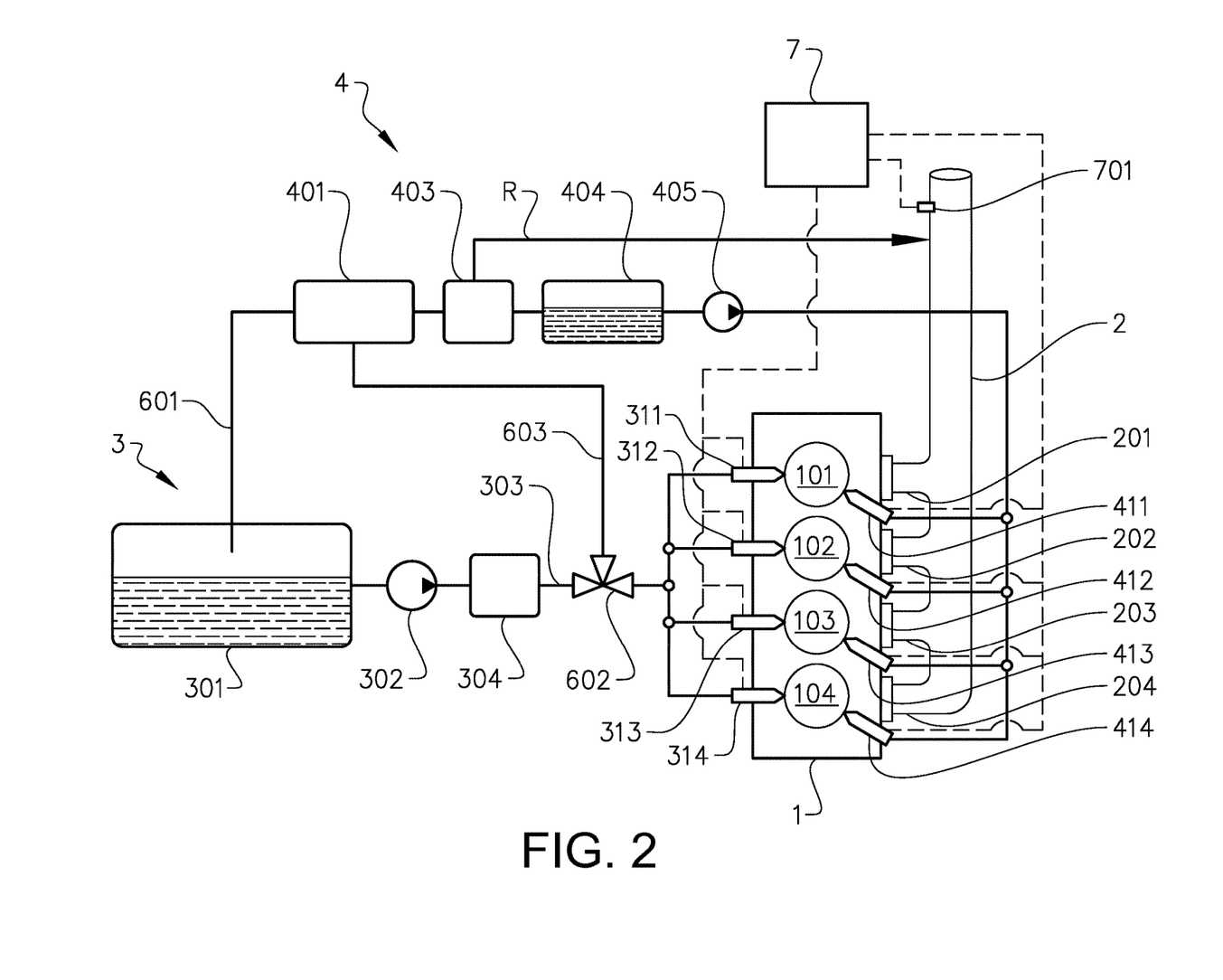
FIG. 2 is a diagram of an engine system in the vehicle in FIG. 1.

FIG. 2 depicts components of the engine system including the engine 1 which has four cylinders 101. The engine system comprises an air intake system 2 for the engine 1. The air intake system 2 presents for each cylinder 101 an air conduit 201-204 dedicated for a respective of the cylinders 101.

The engine system also comprises a fuel system, which in turn comprises a first gas injection system 3 for injecting a first gaseous fuel into the cylinders 101. Any suitable type of gaseous fuel may be used; in this example the first gaseous fuel is liquid natural gas comprising methane.

The first gas injection system 3 comprises a first container 301 for the first gaseous fuel to be injected by the first gas injection system 3. The first container 301 is a liquid natural gas (LNG) tank. The first gas injection system 3 further comprises a high pressure injector 311-314 at each cylinder 101, herein also referred to as a first injector. The first gas injection system 3 further comprises, between the first container 301 and the high pressure injectors 311-314, a high pressure pump 302, herein also referred to as a first pump. The first gas injection system 3 also comprises an evaporator (not shown). Thus, the high pressure pump 302 is arranged to provide the first gaseous fuel from the first container 301 to the high pressure injectors 311-314, via a high pressure buffer tank 304, and a high pressure fuel conduit 303, herein also referred to as a first conduit.

It should be noted that the high pressure injectors 311-314 are arranged to change the fuel injection pressure, e.g. based on the engine load. Thus, the high pressure injector pressure may vary depending on the operational situation of the engine.

The fuel system further comprises a second fuel system 4 for injecting a second fuel, in the form of a pilot fuel, into the cylinders 101. In accordance with this embodiment of the invention, the second fuel system 4 comprises a second container 401 arranged to accumulate first gaseous fuel from the first container 301. The first gaseous fuel accumulated in the second container is herein also referred to as waste gas. The transport of gaseous fuel from the first container 301 to the second container 401 may occur in at least three ways:

a) Boil-off gas from the first container; i.e. when the temperature of the first gaseous fuel increases resulting increased saturated gas pressure. The first gaseous fuel forming boil-off gas is transported from the first container 301 to the second container 401 via a boil-off conduit 601.

b) When gas injection pressure in the first gas injection system 3 is decreased during operation of the engine, e.g. due to a decrease in the engine load, the first gaseous fuel in the high pressure fuel conduit 303 is transported via a relief valve 602 in the high pressure fuel conduit 303, and a relief conduit 603, to the second container 501. The release valve 602 is adapted to adjust its setting based on an actual injection pressure exceeding a desired injection pressure. When there is an excess of pressure in the high pressure fuel conduit 303, the release valve 602 will open a connection between the high pressure conduit 303 and the relief conduit 603.

c) When the engine is stopped, the high pressure fuel conduit 303 is emptied from the first gaseous fuel, which is transported via the relief valve 602 in the high pressure fuel conduit 303, and the relief conduit 603, to the second container 501.

The second fuel system 4 also comprises a fuel converter 403, which is arranged to convert the waste gas to a second fuel, as described closer below. The second fuel system 4 also comprises a third container 404, which is arranged to store the second fuel from the fuel converter 403, and a pilot fuel injector 411-414, herein also referred to as a second fuel injector, at each cylinder 101. The second fuel system 4 further comprises, between the third container 404 and the pilot fuel injectors 411-414, a second fuel pump 405. Thus, the second fuel pump 405 is arranged to provide the second fuel from the third container 404 to the pilot fuel injectors 411-414. It should be noted that in each cylinder 101 the respective high pressure injector 311-314 and pilot fuel injector 411-414 may be provided as separate units, or combined in a single combination injector, as is known per se.

The engine system further comprises a control unit 7 which is arranged to control the high pressure injectors 311-314 individually, and to control the pilot fuel injectors 441-414 individually. The control unit 7 is further arranged to determine the load of the engine during its operation in the vehicle, as is known per se, e.g. based on signals from a manifold absolute pressure (MAP) sensor 701, located in the intake system 4, a mass air flow (MAF) sensor and/or an accelerator pedal position (APP) sensor, (not shown).

Figure 3:
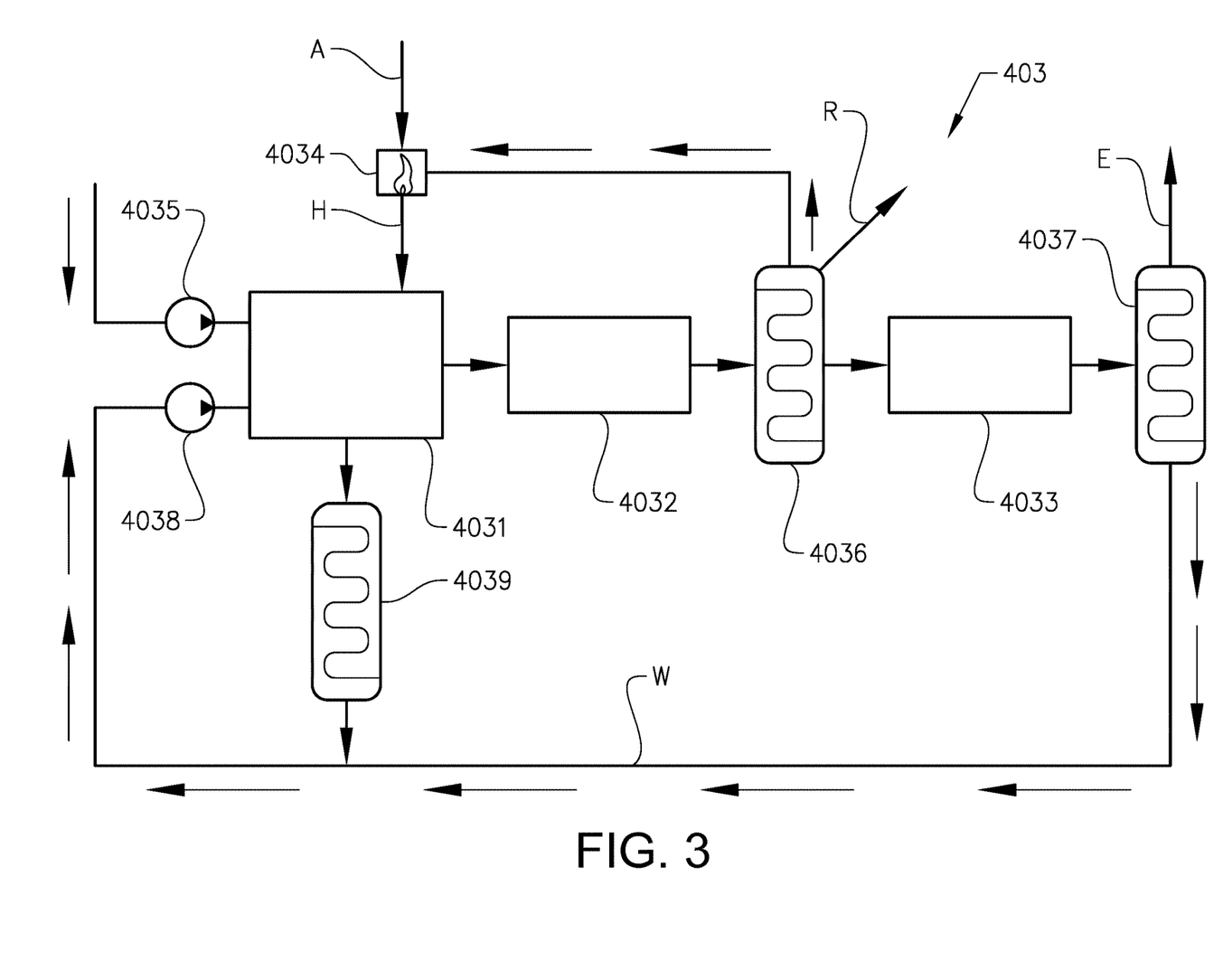
FIG. 3 is a diagram of a fuel converter in the engine system in FIG. 2.

Reference is made to FIG. 3. The fuel converter 403 comprises a steam reformer 4031 for reforming the waste gas to syngas, i.e. carbon monoxide, CO, and hydrogen, 112, in a ratio of 1:3. More specifically, the steam reformer 4031 is arranged to provide a process where methane, water and heat are reacted to form carbon monoxide and hydrogen, $CH_4+H_2O \rightarrow CO+3H_2$. A pump 4035 is provided to pump the waste gas from the second container 401 to the steam reformer 4031.

The fuel converter 403 further comprises a methanol reactor 4032 for producing methanol based on the syngas from the steam reformer 4031. More specifically, the methanol reactor 4032 is arranged to provide a process where carbon monoxide and hydrogen are reacted to form methanol and hydrogen, $CO+3H_2 \rightarrow CH_3OH+H_2$. A condenser 4036 is provided to condense the methanol produced by the methanol reactor 4032 from a gaseous form to a liquid form. It may be beneficial to provide in the methanol reactor 4032 a pressure of 10-100 bar. Therefore, in some embodiments a compressor may be provided upstream of the methanol reactor 4032. In embodiments were the steam reactor 4031 works at a pressure which is lower than the pressure in the second container 401, said pump 4035 may be omitted, and in such cases, the compressor upstream of the methanol reactor 4032 will be advantageous.

In addition, the fuel convener 403 comprises a DME reactor 4033 for producing the second fuel in the form of dimethyl ether (DME) based on the methanol produced by the methanol reactor 4032, to be guided to the third container 404 as indicated by the arrow E. More specifically, the DME reactor 4033 is arranged to provide a process where methanol is converted to DME and water, $2\ CH_3OH \rightarrow CH_3OCH_3+H_2O$. A further condenser 4037 is provided to condense the second fuel produced by the DME reactor 4033 from a gaseous form to a liquid form.

It should be noted that the methanol reactor 4032 and the DME reactor 4033 may be provided separately as sketched in FIG. 3, or as a single reactor. Thereby, a single condenser provided downstream of the single reactor may replace both the condenser 4036, provided to condense the methane produced by the methanol reactor 4032, and a further condenser 4039, described below.

The fuel converter 403 further comprises a heat generating device 4034, in the form of a burner or catalyst, arranged to receive surplus products from the condenser 4036, in the form of hydrogen, unreacted carbon monoxide and rest methane, from the methanol reactor 4032. The heat generating device 4034 is arranged to generate heat for the steam reformer 4031, as indicated by the arrow H, by means of the surplus products. The heat generating device 4034 is arranged to receive air, for the process therein as indicated with the arrow A. The fuel converter 403 is also arranged to separate water from the surplus products and guide the water to the steam reformer 4031 for use therein.

In addition, the fuel converter 403 is arranged to separate water and methanol remaining after the DME reactor 4033 and guide it back, by means of a pump 4038, to the steam reformer 4031 as indicated by the line W in FIG. 3. Surplus water from the steam reformer 4031 is recirculated to the steam reformer via a condenser 4039 and the pump 4018.

Rest products, herein also referred to as excess gas or off-gases, may be produced by the condenser 4036 provided to condense the methane produced by the methanol reactor 4032. The rest products may include hydrogen, carbo monoxide and/or methane in excess of what is needed for the heat venerating device. Therefore, the fuel system is arranged to guide such rest products to the air intake system 2, as indicated by the arrow R in FIG. 2 and FIG. 3, to be combusted in the cylinders 101. In alternative embodiments, the fuel system may be arranged to guide such rest products to be injected directly into one or more cylinders, e.g. by means of dedicated injectors (not shown), or to an exhaust after treatment system (not shown) for the engine.

Overall, the fuel converter 403 is arranged to provide a process in which methane and oxygen is converted to DME and water, $2\ CH_4+O_2 \rightarrow CH_3OCH_3+H_2O$.

Figure 4:
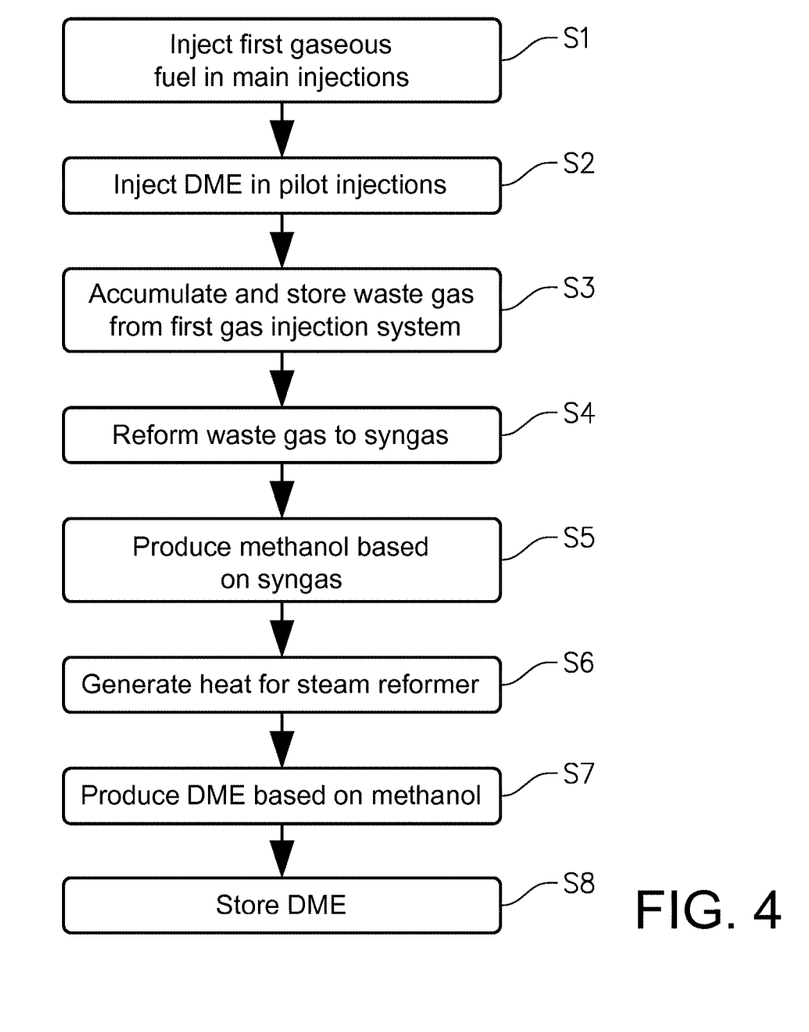
FIG. 4 is a now diagram depicting steps in a method in the engine system in FIG. 2.

With reference to FIG. 4, a method for controlling the engine 1 will be described.

During operation of the engine, by means of the high pressure pump 302 the first gaseous fuel is provided from the first container 301 via a high pressure fuel conduit 303 to the high pressure injectors 311-314, where it is injected S1 in main injections in the cycles in the cylinders 101, also referred to herein as combustion cycles. By means of the second fuel pump 405, DME is provided from the third container 404 to the pilot fuel injectors 411-414, where it is, in order to ignite the combustions in the cycles in the cylinders 101, injected S2 in pilot injections, i.e. in said combustion cycles.

The method further comprises accumulating and storing S3 the waste gas from the first gas injection system 3 in the second container 401, This accumulation may be done, for example as mentioned above, i.e. (a) as boil-off gas received via the boil-off conduit 601, or (b or c) transported via the relief valve 602 and the relief conduit 603 at a first gas injection system pressure decrease or during a temporary engine stoppage.

The waste gas is transported by means of the pump 4035 from the second container 401 to the fuel converter 403, In the fuel converter 403 the waste gas is reformed S4 by means of the steam reformer 4031 to syngas. By means of the methanol reactor 4032 methanol is produced S5 based on the syngas from the steam reformer 4031. The methanol is separated from the surplus products created by the methanol reactor process. By means of the heat generating device 4034 and the surplus, products, heat for the steam reformer 4031 is generated S6.

DME is produced S7 by means of the DME reactor 4033 based on the methanol produced by the methanol reactor 4032. The DME is guided to the third container 404 where it is stored S8.

Alternative arrangements of the fuel converter are possible. For example, the fuel converter 403 may comprise an autotherm reformer for mixing the waste gas with air as a reactant for producing syngas. More specifically, the autotherm reformer may be arranged to provide a process where methane and air are reacted to give carbon monoxide and hydrogen, approximately as $CH_4+0.42\ O_2+1.6\ N_2+0.15\ H_2O \rightarrow CO+2.15\ H_2+1.6\ N_2$. Methanol may then be produced, approximately as: $CO+2.15H_2+1.6\ N_2 \rightarrow CH_3OH+H_2+1.6\ N_2$, whereupon DME may be produced based on the methanol. However, where an autotherm reformer is used, a further reactor may be provided and arranged to convert the syngas directly to DME.

In further embodiments, the fuel convener 403 may comprise a Fisher-Tropsch reactor to produce the second fuel in the form of a diesel-like hydrocarbon, which then would act as ignitor fuel instead of the DME.

It is to be understood that the present invention is not limited to the embodiments described above and illustrated in the drawings; rather, the skilled person will recognize that many changes and modifications may be made within the scope of the appended claims.

The invention claimed is:

1. A method for controlling a high pressure gas injection internal combustion engine comprising at least one cylinder, the method comprising:
supplying a first gaseous fuel from a first gas injection system,
injecting the first gaseous fuel in at least one of the at least one cylinder,
converting waste gas from the first gas injection system to a second fuel that is different from the first gaseous fuel, and
injecting the second fuel obtained by the step of converting waste gas into at least one of the at least one cylinder.

2. The method according to claim 1, wherein the first gaseous fuel supplied from the first gas injection system is liquid natural gas (LNG).

3. The method according to claim 1, wherein the step of injecting the second fuel comprises injecting the second fuel obtained by the step of converting waste gas into the at least one cylinder into which the first gaseous fuel is injected.

4. The method according to claim 1, wherein the step of injecting the first gaseous fuel comprises injecting the first gaseous fuel in a combustion cycle in the at least one cylinder, and the step of injecting the second fuel comprises injecting the second fuel obtained by the step of converting waste gas in a further injection in the combustion cycle.

5. The method according to claim 4, wherein the injection of the first gaseous fuel is a main injection, and the injection of the second fuel is a pilot injection.

6. The method according to claim 1, wherein the first gas injection system comprises a first container.

7. The method according to claim 6, wherein the step of converting waste gas from the first gas injection system to the second fuel comprises converting boil-off gas from the first container to the second fuel.

8. The method according to claim 1, wherein the first gas injection system comprises at least one first injector for the injecting of the first gaseous fuel, and a first conduit for guiding the first gaseous fuel to the at least one of the at least one cylinder, and the step of converting waste gas from the first gas injection system to the second fuel comprises converting first gaseous fuel received from the first conduit to the second fuel.

9. The method according to claim 1, further comprising storing the waste gas from the first gas injection system in a second container before converting the waste gas to the second fuel.

10. The method according to claim 1, further comprising storing the second fuel obtained by the step of converting waste gas before injecting the second fuel.

11. The method according to claim 1, wherein the second fuel obtained by the step of converting waste gas is a liquid fuel.

12. The method according to claim 1, wherein the second fuel obtained by the step of converting waste gas is dimethyl ether (DME).

13. The method according to claim 1, wherein the step of converting waste gas to the second fuel comprises reforming the waste gas to syngas.

14. The method according to claim 13, wherein the step of converting waste gas to the second fuel comprises producing methanol based on the syngas.

15. The method according to claim 14, wherein the step of converting waste gas to the second fuel comprises producing the second fuel in the form of dimethyl ether (DME) based on the methanol.

16. The method according to claim 14, further comprising using at least one surplus product from the step of producing methanol for heat generation (S6) for the step of reforming the waste gas to syngas.

17. The method according to claim 16, wherein the at least one surplus product is hydrogen, unreacted carbon monoxide and/or rest methane.

18. The method according to claim 1, further comprising providing a fuel converter for the step of converting the waste gas to the second fuel, and guiding excess gas from the fuel converter to the high pressure gas injection internal combustion engine.

19. The method according to claim 1, comprising providing a fuel converter for the step of converting the waste gas to the second fuel, and guiding excess gas from the fuel converter to an exhaust after treatment system serving the high pressure gas injection internal combustion engine.

20. The method according to claim 1, wherein the step of converting the waste gas to the second fuel comprises mixing the waste gas with air as a reactant for an autotherm reformer for producing dimethyl ether (DME).

21. The method according to claim 1, wherein the step of converting the waste gas to the second fuel comprises a use of a Fisher-Tropsch reactor to produce the second fuel in the form of a hydrocarbon.

22. A fuel system for a high pressure gas injection internal combustion engine comprising at least one cylinder, the fuel system comprising:
a first gas injection system for injecting a first gaseous fuel into at least one of the at least one cylinder,
a second fuel injection system arranged to receive waste gas from the first gas injection system,
characterised in that the second fuel injection system comprises a fuel converter for converting the received waste gas to a second fuel that is different from the first gaseous fuel, and in that the second fuel injection system is arranged to inject the second fuel into at least one of the at least one cylinder.

23. The fuel system according to claim 22, wherein the second fuel injection system is arranged to inject the second fuel obtained by converting the received waste gas into the at least one cylinder into which the first gaseous fuel is injected.

24. The fuel system according to claim 22, wherein the first gas injection system is arranged to inject the first gaseous fuel in a combustion cycle in the at least one cylinder, and the second fuel injection system is arranged to inject the second fuel obtained by converting the received waste gas in a further injection in the combustion cycle.

25. The fuel system according to claim 24, wherein the injection of the first gaseous fuel is a main injection, and the injection of the second fuel is a pilot injection.

26. The fuel system according to claim 22, wherein the first gas injection system comprises a first container for storing the first gaseous fuel.

27. The fuel system according to claim 26, wherein the first container is a liquid natural gas (LNG) tank.

28. The fuel system according to claim 22, wherein the second fuel injection system comprises a second container for storing the received waste gas before converting the received waste gas to the second fuel.

29. The fuel system according to claim 22, wherein the second fuel injection system comprises a third container (404) for storing the second fuel before injecting the second fuel into the at least one cylinder in a pilot injection.

30. The fuel system according to claim 22, wherein the fuel converter comprises a steam reformer for reforming the waste gas to syngas.

31. The fuel system according to claim 30, wherein the fuel converter comprises a methanol reactor for producing methanol based on the syngas from the steam reformer.

32. The fuel system according to claim 31, wherein the fuel converter comprises a DME reactor for producing the second fuel in the form of dimethyl ether (DME) based on the methanol produced by the methanol reactor.

33. The fuel system according to claim 31, wherein the fuel converter comprises a heat generating device arranged to receive at least one surplus product from the methanol reactor and to generate heat for the steam reformer by means of the surplus product.

34. The fuel system according to claim 22, wherein the fuel converter comprises an autotherm reformer for producing the second fuel in the form of dimethyl ether (DME).

35. The fuel system according to claim 22, wherein the fuel converter comprises a Fisher-Tropsch reactor to produce the second fuel in the form of a hydrocarbon.

36. The fuel system according to claim 22, wherein the second fuel injection system is arranged to guide excess gas from the fuel converter to the high pressure gas injection internal combustion engine.

37. The fuel system according to claim 22, wherein the second fuel injection system is arranged to guide excess gas from the fuel converter to an exhaust after treatment system serving the high pressure gas injection internal combustion engine.

38. A vehicle comprising a high pressure gas injection internal combustion engine and the fuel system according to claim 22.

* * * * *